H. A. MYERS.
INTERCHANGEABLE CONTROLLING MECHANISM.
APPLICATION FILED AUG. 28, 1914.
1,167,100.
Patented Jan. 4, 1916.
3 SHEETS—SHEET 1.
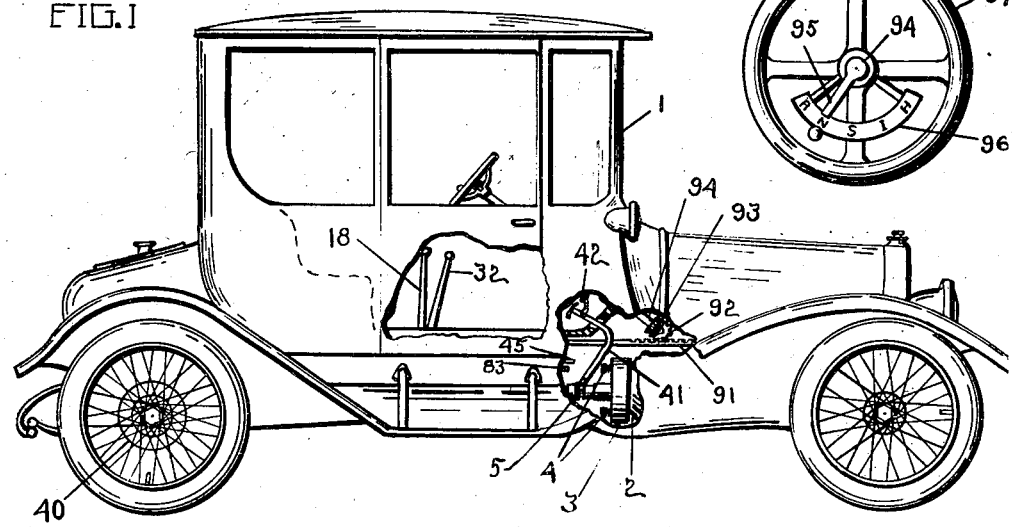
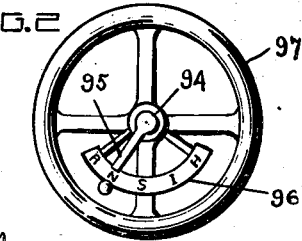
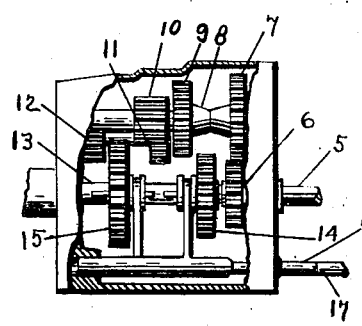
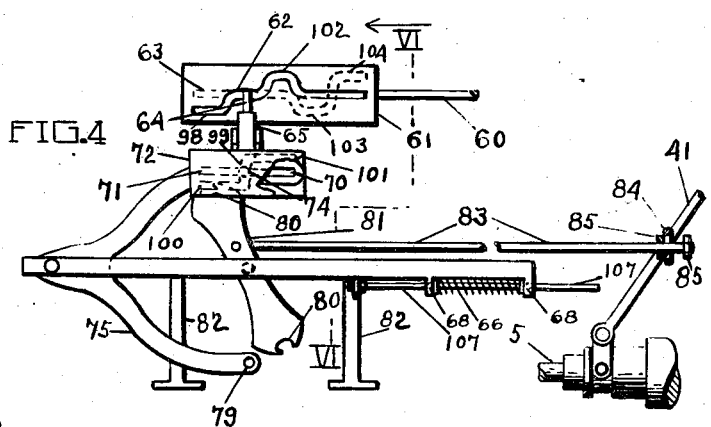
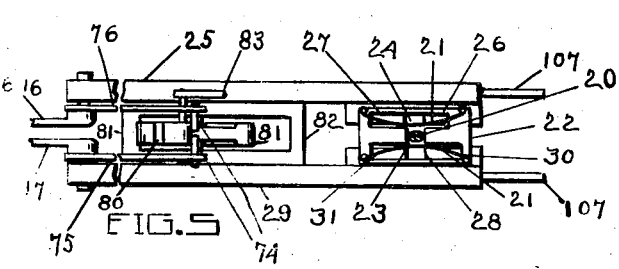
Witnesses
Gladys Jamison.
Inventor
Hubert A. Myers
By Geo E Kirk
Attorney

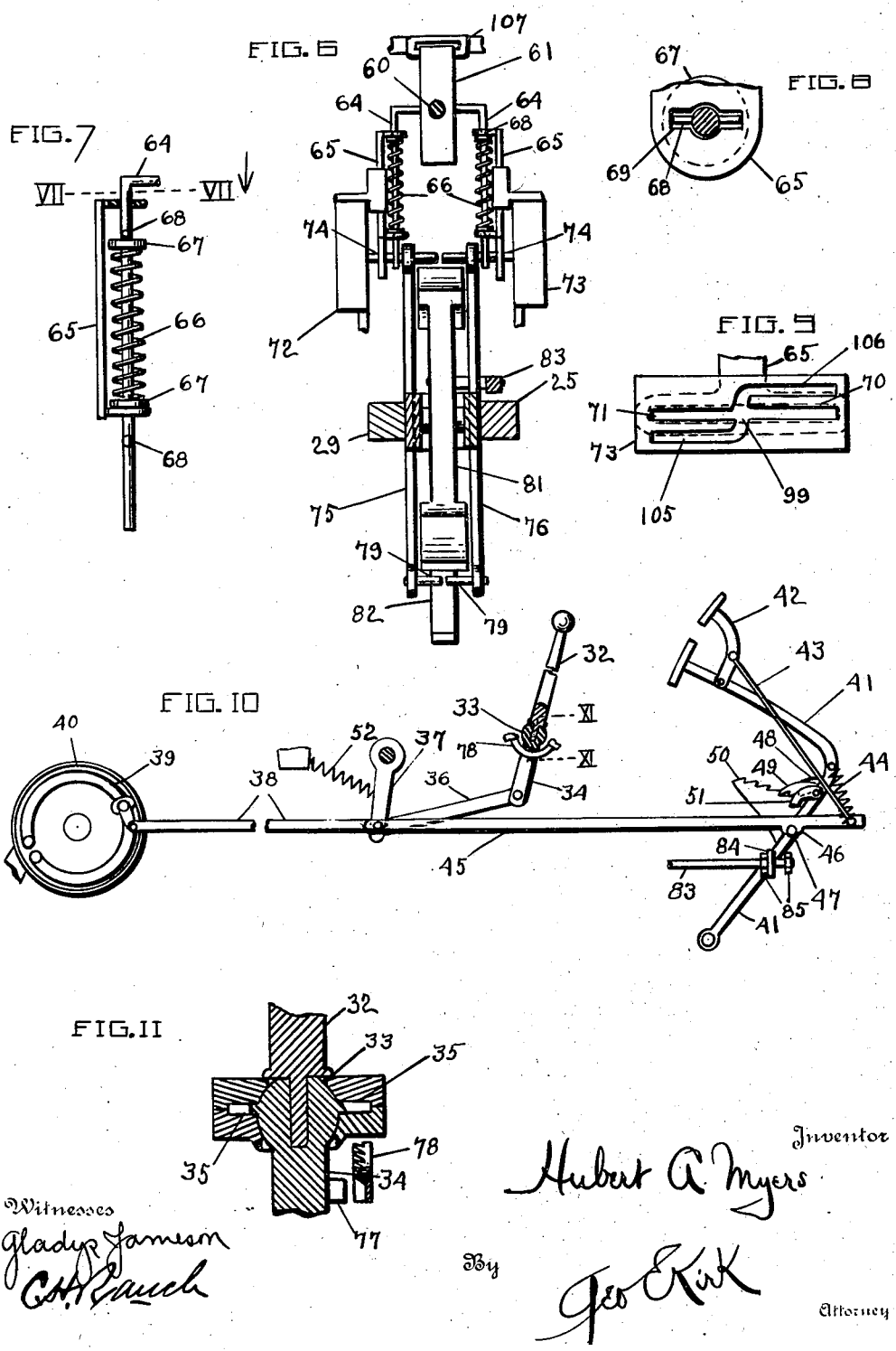

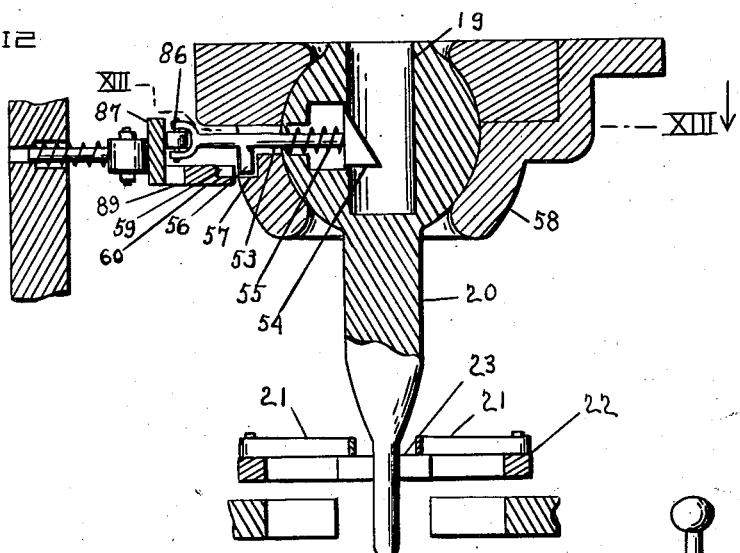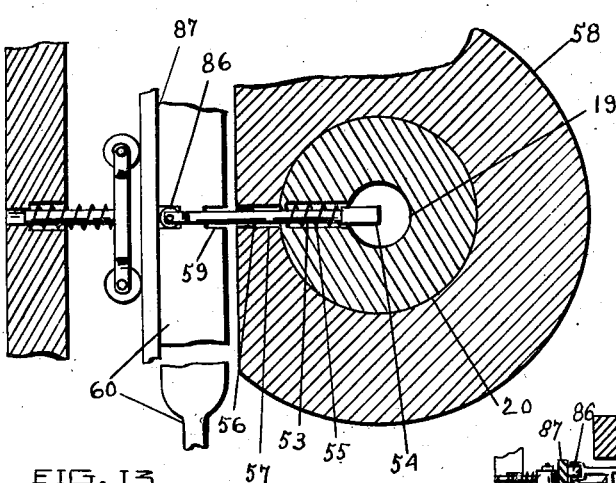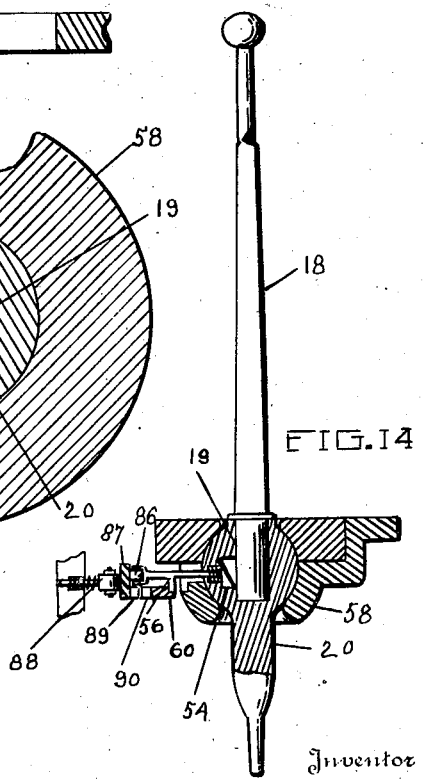

UNITED STATES PATENT OFFICE.

HUBERT A. MYERS, OF TOLEDO, OHIO, ASSIGNOR OF ONE-HALF TO ALBERT A. ATWOOD, OF TOLEDO, OHIO.

INTERCHANGEABLE CONTROLLING MECHANISM.

1,167,100.

Specification of Letters Patent. Patented Jan. 4, 1916.

Application filed August 28, 1914. Serial No. 859,021.

*To all whom it may concern:*

Be it known that I, HUBERT A. MYERS, a citizen of the United States of America, residing at Toledo, Lucas county, Ohio, have invented new and useful Interchangeable Controlling Mechanism, of which the following is a specification.

This invention relates to controlling mechanism for changing driving relations of mechanisms and features of different modes of operation therefor.

This invention has utility when embodied in connection with manual and automatic gear shifting mechanisms for changing the speed and controlling motor vehicles.

Referring to the drawings: Figure 1 is a side elevation, with parts broken away, of an embodiment of the invention in a motor vehicle; Fig. 2 is a plan view of the steering wheel for the motor vehicle, showing one of the selector devices incorporated therewith; Fig. 3 is a plan view, with parts broken away of the transmission or variable speed gearing; Fig. 4 is a fragmentary side elevation of features of the independent selector and automatic or pedal gear shifting or driving relation connection effecting device; Fig. 5 is a plan view of the devices of Fig. 4, with the selector elements removed; Fig. 6 is a view on the line VI—VI, Fig. 4, looking in the direction of the arrow; Fig. 7 is a fragmentary detail of the double neutral spring, or yieldable selector directed device for the actuators; Fig. 8 is a view on the line VIII—VIII, Fig. 7, looking in the direction of the arrow; Fig. 9 is a side elevation of one of the fixed guides for holding the actuator in selected connection during the full travel away from disconnecting position; Fig. 10 is a fragmentary side elevation of the alternative brake operating devices; Fig. 11 is a section on the line XI—XI, Fig. 10; Fig. 12 is a vertical section on an enlarged scale through a portion of the floor of the vehicle adjacent the base of the gear shifting handle; Fig. 13 is a section on the line XIII—XIII, Fig. 12, looking in the direction of the arrow; and Fig. 14 is a view similar to Fig. 12, on a smaller scale, and showing the handle in position to connect up the selector and driving relation effecting device for operation from the handle.

The motor vehicle 1 is not disclosed as having any particular structural location and connections to other members, but may be considered as normally mobile as to a more or less regular supporting surface or way, and is provided with the motor or internal combustion engine 2 (which may be located forwardly of the vehicle and carried by said vehicle 1 by being connected thereto) for driving the clutch 3 (located adjacent the motor 2 to be connected thereto for actuation thereby), normally held in driving relation by the springs 4 (located on the clutch and operatively connected thereto) to rotate the shaft 5 (Fig. 1). The shaft 5 extends to the transmission gearing (Fig. 3) located in the housing carried by the vehicle 1 and has on the end thereof the gear 6 in mesh with the gear 7 on the countershaft 8, to which are also fixed the gears 9, 10. The gear 10 is in mesh with the gear 11 to drive the gear 12. In line with the shaft 5 is the driven shaft 13 having splined thereon the gears 14, 15. By means of the reciprocable shift bar 16, extending into the transmission gearing housing, the gear 14 may be moved toward the gear 6 to connect the shaft 13 for direct or high speed driving forward from the driving shaft 5. Opposite direction shifting of the gear 14 will drive the shaft 13 at intermediate or second speed forward through the gears 6, 7, 9, 14. Movement of the shift bar 17 extending into the transmission gearing housing forwardly will bring the gear 15 into mesh with the gear 10 and drive the shaft 13 at slow or first speed forward. Opposite direction shifting of this bar 17 will bring the gear 15 into mesh with the gear 12 to operate the shaft 13 in a reverse direction, serving to back the vehicle. The parts as shown in Fig. 3 are in neutral or disconnected position.

The handle 18 located as extending upwardly from the central floor of the vehicle within convenient reach of the driver of the vehicle 1 (Fig. 14) may be readily inserted into or removed from the socket 19 in the universally pivoted lower lever section 20 located adjacent the floor of the vehicle. This lever section 20 is normally held in central or vertical position by the springs 21 on the H-plate or fixed guide 22 for the section 20 (Figs. 12, 5). This handle 18 may serve as a selector device and driving relation connection effecting device for the variable speed transmission gearing, or mechanism for establishing a plurality of driving relations for the vehicle.

From the central disconnected position of the section 20 in the cross guide portion 23 of the H-plate 22, the handle may be rocked so that the section 20 will enter the notch 24 (Fig. 5) of the shift member 25 connected to the shift bar 16. Continuing the operation, the desired speed is obtained by drawing the handle 18 toward the operator or rearward in the vehicle 1, and section 20 passes into the guide portion 26 of the H-plate 22, and the gear 14 thus moved by the bar 16 is connected up by direct clutch with the gear 6 for high speed driving forward. Opposite driving relation effecting actuation of the handle 18 will cause this device to have the portion 20 travel in the guide 27 of the H-plate 22, shifting the bar 16 and the gear 14 in the opposite direction and determine the vehicle speed as intermediate or second speed forward in driving through the gears 9, 14.

The section 20 is kept in engagement with the notch 24 until the section 20 registers with the guide portion 23, thus insuring return of the bar 16 to a position neutral or disconnecting for its gear 14. Rocking section 20 transversely and away from the notch 24 causes it to enter the notch 28 of the shift member 29 connected to the shift bar 17. With the section 20 rocked by the handle 18 into the guide portion 30 of the H-plate, the gear 15 through actuation by the bar 17 is shifted into mesh with the gear 11, and the vehicle is connected up for slow or first speed forward driving. Oppositely rocking the section 20 into the guide portion 31 of the H-plate, moves the bar 17 to bring the gear 15 into mesh with the gear 12 for reverse or backward driving of the vehicle. This device as controlled through the handle element 18 thereof is effective in selecting and driving relation connecting different speeds of the mechanism. The section 20 may not engage for two connections at once, as the H-plate determines the double rocking travels, and the shift members must each be brought into gear disconnecting position for change through the fixed H-plate before the other may be engaged.

Disposed adjacent the removable handle 18 is another removable handle 32 (Figs. 1, 10) located as extending upwardly from the central floor of the vehicle within convenient reach of the driver of the vehicle 1. As these handles 18, 32, are designed for alternative control of the mechanism and vehicle, in the alternative use, each may be removed and the floor space left clear. The handle 32 may serve to control the emergency brake. The handle 32 may removably engage or seat in the socket 33 of the lever section 34 having the universal bearing 35 located adjacent the floor of the vehicle (Fig. 11) permitting the rocking motion of the section 34. The lever section 34 is connected by the link 36 to the hanging arm 37 in operative communication with the link 38 operating the brake 39 to hold the member 40 on the rear axle of the vehicle from rotation.

With the handle 32 removed, operation of the brake 39 may be effected through the clutch pedal or foot lever 41 (Fig. 10) located as extending upwardly through the floor of the vehicle 1 for convenient operation by the driver of the vehicle. Adjacent the tread of the pedal 41 and pivotally connected thereto is a supplementary tread or relatively movable member 42 against which the toe of the operator may be pressed when the foot of the operator is in position to operate the pedal 41, to cause the link 43 pivotally connected to the member 42 to act against the resistance of the spring 44 extending from the lever 41 to the member 42 in moving the bar 45 to which the link 43 is pivotally connected down to have notch 46 in the bar 45 embrace the pin 47 on the lever 41. The bar 45 is connected through the rocker arm 37 and link 38 therefrom to actuate the brake 39. From initial or disconnected position, this brake operating connection to the lever 41 may be made, by rocking the member 42 forward and then forcing forward of the clutch lever 41 against the resistance of the springs 4 releases the clutch 3. This travel of the lever 41 with its pin 47 engaging the notch 46 in the bar 45, through its arm 37 connection with the link 38 will simultaneously set the brake 39. The spring 48 on the lever 41 will urge the multiple toothed dog 49 also carried by the lever 41 into engagement with the fixed ratchet 50 to hold the lever 41 forward and the brake 39 set. To release the brake, the pedal lever 41 may be moved but slightly forward so that the dog 49 is not bound in the ratchet 50, and toe element 42 oscillated. The spring 44 will then bring the bar 45 up to strike the arm 51 and hold the dog 49 free of the ratchet 50, and the pedal 41 is free to move back in its recover travel as actuated by the springs 4, and during this travel the brake is released by the spring 52, extending from a fixed part of the vehicle to the arm 37 (Fig. 10).

With the brake 39 in released postion, it may be thrown by the pedal 41 whether or not the handle 32 is in the socket 33. Upon the removal of the handle 18 from the socket 19 (Figs. 12, 13, 14), the section 20 is automatically locked in neutral position by the latch bolt 53 mounted therein, the head 54 of which is driven by the spring 55 (about the bolt 53 and disposed in the section 20) into the socket 19. This travel of the bolt 53 carries with it the tooth 56 to enter the notch 57 in the lower universal fixed bearing member 58 for the section 20, thereby locking the member 20 in the guide portion 23 of the H-plate 22. This locking of the handle selector shift combined device automatically connects up the pedal shift and independent selector. With the handle 18 in position, the tooth 56 is in the notch 59 of the bar 60 (disposed below the central portion of the vehicle floor) reciprocable, when not so held, to be responsive to independent speed selections. With this bar 60 so locked, the selector plate 61 to which this bar 60 is connected is positively held to maintain the controlled elements in neutral disconnecting position. That is, the groove or guide ways 62, 63, in opposite sides of the plate 61 (Figs. 4, 6, 7, 8) position the rods 64 engaging therewith medially of the yokes 65 so that the springs 66 acting against the collars 67 are permitted by the pins 68 movable through the slots 69 in the ears of the yokes 65, to abut said ears 65'. In this position of the yokes 65, the yoke extension slots 70 are yieldably held to position the actuator pins 74 centrally of the fixed guide way 71 in the plates 72, 73 (Figs. 4, 6, 9), by the extension slots 70 engaging the pins 74 of the respective actuators 75, 76. The plates 72, 73 are carried by the supporting brackets partially broken away in Fig. 6, mounting these plates in fixed position as to the vehicle frame. The actuator pins 74 rock the actuators 75, 76 into their central or medial positions, thereby holding the actuator driving pins 74, 79 out of engagement with the recesses 80 of the rockable member 81 mounted on the frame 82 between the reciprocable members 25, 29. The member 81 is driven by the link 83 extending through the eye 84 carried by the lever 41. Collars or nuts 85 on the link 83 on each side of the eye 84 allow the pedal 41 to take sufficient travel to free the clutch 3 before the link 83 may be operated to rock the member 81. However, with the handle 18 not withdrawn, this rocking of the member 81 from the pedal 41 serves no purpose, for the tooth 56 is then holding the selector plate 61 as shown in Fig. 4, with the actuators 75, 76 out of position to be engaged by the member 81. The withdrawal of the handle 18 and simultaneous operation of the bolt 53, not only withdraws the tooth 56 from holding position as to the bar 60, but through the roller 86 carried by the bolt 53 moving inward from the bar 87, the opposing yielding antifriction bearing 88 contacting the bar 87, forces the tooth 89 of the bar 87 into the notch 90 (Figs. 12, 13, 14), in the bar 60, thereby locking the bars 87, 60 for reciprocation together. The bar 87 at its forward end has a rack 91 (Figs. 1, 2) with which engages the toothed segment 92 driven by the bevel gear 93 on the rod 94 having the arm 95 movable about the selector indicator plate 96 carried in the steering wheel 97. From the disconnecting position of the steering wheel selector device and the independently operable driving relation effecting connecting device of the pedal, as shown in Fig. 14, removable handle 18 when withdrawn at once brings these devices into operative position of Figs. 12, 13. Movement of the arm 95 in the steering wheel to position R on the indicator 96 also in the steering wheel at once draws the plate 61 to position the guide slot 98 therein for rocking the actuator 75 downward and thereby connecting up the shift bar 17 for rearward shifting or to reverse driving connection by the spring 66 urging a yoke 65 and its extension slot 70 downward against the pin 74 to cause the pin 74 in its travel from the junction 99 in the plate 72 (Fig. 9) to be urged downward into the way 100, bringing the pin 74 into the upper recess 80 of the rockable member 81 and carrying the actuator 75 rearward. The guide 100 holds pin 74 in the recess 80 until returned to the junction 99, when neutral selection will hold the pin 74 in the line of guide way 71, while S or slow will direct into guide 101, of the plate 72, with resulting connection of pin 79 with lower recess 80 to shift the gear 15 into mesh with the gear 11, in the pulling of the shift bar 17 forwardly. This selection is made by the plate 61 being in position to have the guide 102 therein (Fig. 4) effective. Continuous with the way 63 in the plate 61 are the guide sections 103, 104, controlling the driving relation effecting connections of the actuator 76 adjacent the actuator 75 respectively for intermediate or second speed forward, and third or high speed forward.
The retaining guide for the former travel is way 105 in the member 73, and for the latter, the way 106 (Fig 9), also in the fixed member 73. The selector plate 61 is directed in its reciprocations by the slide way 107 (Fig. 6).
By incorporating the devices as herein disclosed, simultaneous or automatic pedal control is conveniently possible, with the advantage of clearway in the vehicle floor space; while it is in condition at any time to be discarded and the handles used instead, not only for speed change control but also for handling the brake.
The shift members 25, 29, are normally held in neutral or disconnected position by the double neutral springs similar to the showing in Fig. 7, mounted on the rods 107' extending from the uprights 82 (Fig. 4). With the automatic or foot lever control disconnected and the hand lever 18 operative, the lever section 20 is rocked against the resistance of springs 21 into engagement with the desired shift bar 25 or 29, and then rocked forward or back in the desired arm of the H-plate 22. At the limit of throw in this H-plate 22, the springs 21 with which the lever section 20 coacts lock the shifted gears in the driving relation position against the resistance of the spring 66 on the rod 107'.

In the manual operation of the emergency brake through the handle 32, when the brake 39 is in locked position, the lower lever section 34 may have its tooth 77 (Fig. 11) swung into engaging position with the undercut teeth of the fixed rack 78 and thereby lock the brake in set or operative position. Pushing of the handle 32 slightly forward and then swinging into central position will release this automatic lock for the brake. The ratchet 49 serves to lock the emergency brake in the foot lever operation and the springs 4 of the clutch 3 act upon the foot lever 41 to maintain the gears of the transmission in their set or shifted position when operated by the foot lever 41. In this operation of the foot lever 41, with the handle 18 removed, the pins 74 ride in the groove or guideways 71 of the fixed guide plates 72, 73. It is during this manual shifting only that there is travel of these pins 74 in the ways 71.

In operation, with the handles 18, 32 withdrawn, the selector arm 95 may be moved to the desired indication on the indicator 96 at the steering wheel. This will position the selector plate 61 to actuate one of the pins 74 up or down from the junction 99 in one of the guide plates 72, 73, in accordance with the selection determined. Thrusting forward of the foot lever 41 will release the clutch 3 from the driving motor and cause the link 84 to rock the member 81 into position to engage a pin, 74 or 79, of one of the actuators rocked into engaging position by the selector plate 61. In this travel of the member 81 into position to engage the actuator pin selected, any actuator away from neutral position is thrown back to neutral or disconnected position by the member 81 for the fixed guide plates hold any actuator away from neutral position into engagement with the member 81. Upon its reaching neutral postion, the spring 66 will at once act in accordance with the selection made by the selector plate 61 so that on the recover travel of the foot lever 41, the actuator 75 or 76 selected will be shifted forward or rearwardly to accomplish the driving relation connection determined.

What is claimed and it is desired to secure by Letters Patent is:

1. Mechanism for establishing a plurality of driving relations, a first selector for a driving relation of the mechanism, first actuating means for effecting the driving relation connection selected by the selector, and disconnectible driving relation selecting and actuating means for rendering the first selector and first actuating means inoperative.

2. In a motor vehicle, a driving relation controller including a pair of manually operable members, one of which is movable into operative position to disconnect the other from operative relation.

3. In a motor vehicle, a driving relation controller including a pedal, and a handle movable into position to disconnect the pedal.

4. In a motor vehicle, mechanism for establishing a plurality of driving relations for the vehicle, a handle movable to select and effect driving relation connections for the mechanism, a selector for the driving relations independently of the handle, a pedal for effecting driving relation connections for the mechanism as selected by the selector, and means controlled by the handle to render the selector and pedal operative.

5. Mechanism for establishing a plurality of driving relations, a manual selector and operable simultaneously therewith a driving relation connection effecting device, a second selector, a driving relation connection effecting device controlled by the second selector, and means disconnecting one device when the other is in operative condition.

6. Mechanism for establishing a plurality of driving relations, a first combined selector and driving relation connecting effecting device operable in simultaneously effecting a selection and a driving relation connection, a second selector, a driving relation connection effecting device controlled by the second selector and operable at a different time than the second selector, and means disconnecting one selector when the other is in operative condition.

7. In a motor vehicle, mechanism for establishing a plurality of driving relations for the vehicle, an emergency brake for the vehicle, a motor, a clutch for connecting the motor to the mechanism, a pedal having connections for operating the clutch, the emergency brake, and effecting driving relation connections of the mechanism, and a handle for operating the brake independently of the pedal.

8. A clutch pedal, a clutch operable thereby, a brake, a disconnectible handle for actuating the brake, and connecting means from the pedal for operating the brake.

9. A pedal, a clutch operable thereby, a brake, a handle for actuating the brake, and means for connecting the pedal to operate the brake.

10. A brake, a pedal for operating the brake, a handle for operating the brake, and means for disconnecting the pedal or handle from brake operating connection.

11. Mechanism for establishing a plurality of driving relations, a driven member coacting with the mechanism, a brake for the member, and alternative devices for controlling the driving relation connection of the mechanism and brake operation including a handle.

12. Mechanism for establishing a plurality of driving relations, a member driven with the mechanism, a brake for the member, a first device for controlling the driving relation connections of the mechanism and brake operation, a second and independent device for controlling the driving relation connections of the mechanism, a third and independent device for operating the brake, and means for rendering the second and third devices inoperative.

13. Mechanism for establishing a plurality of driving relations, a member driven with the mechanism, a brake for the member, a first device for operating the brake, means for rendering the first device inoperative, a second device for controlling the driving relation connections of the mechanism, and means for connecting the second device to operate the brake.

14. Mechanism for establishing a plurality of driving relations, a member driven with the mechanism, a brake for the member, a first device for operating the brake, means for rendering the first device inoperative, a second device for controlling the driving relation connections of the mechanism, means for connecting the second device to operate the brake, and means for disconnecting the second device from controlling the driving relation connections of the mechanism.

15. In a motor vehicle, a driving member therefor, a driven member, mechanism for establishing a plurality of driving relations between the members, a brake for the vehicle, a first device for connecting the members for the driving relations of the mechanism, a second device for operating the brake, said devices each including a removable handle, and a third device for effecting driving relation connections of the mechanism between the members, and including a pedal connectible to operate the brake.

In witness whereof I affix my signature in the presence of two witnesses.

HUBERT A. MYERS.

Witnesses:
  GEO. E. KIRK,
  GLADYS JAMESON.